Nov. 1, 1927.
F. H. SMITH ET AL
1,647,586
GOLF COURSE MAINTAINER
Filed Oct. 7, 1926  2 Sheets-Sheet 1
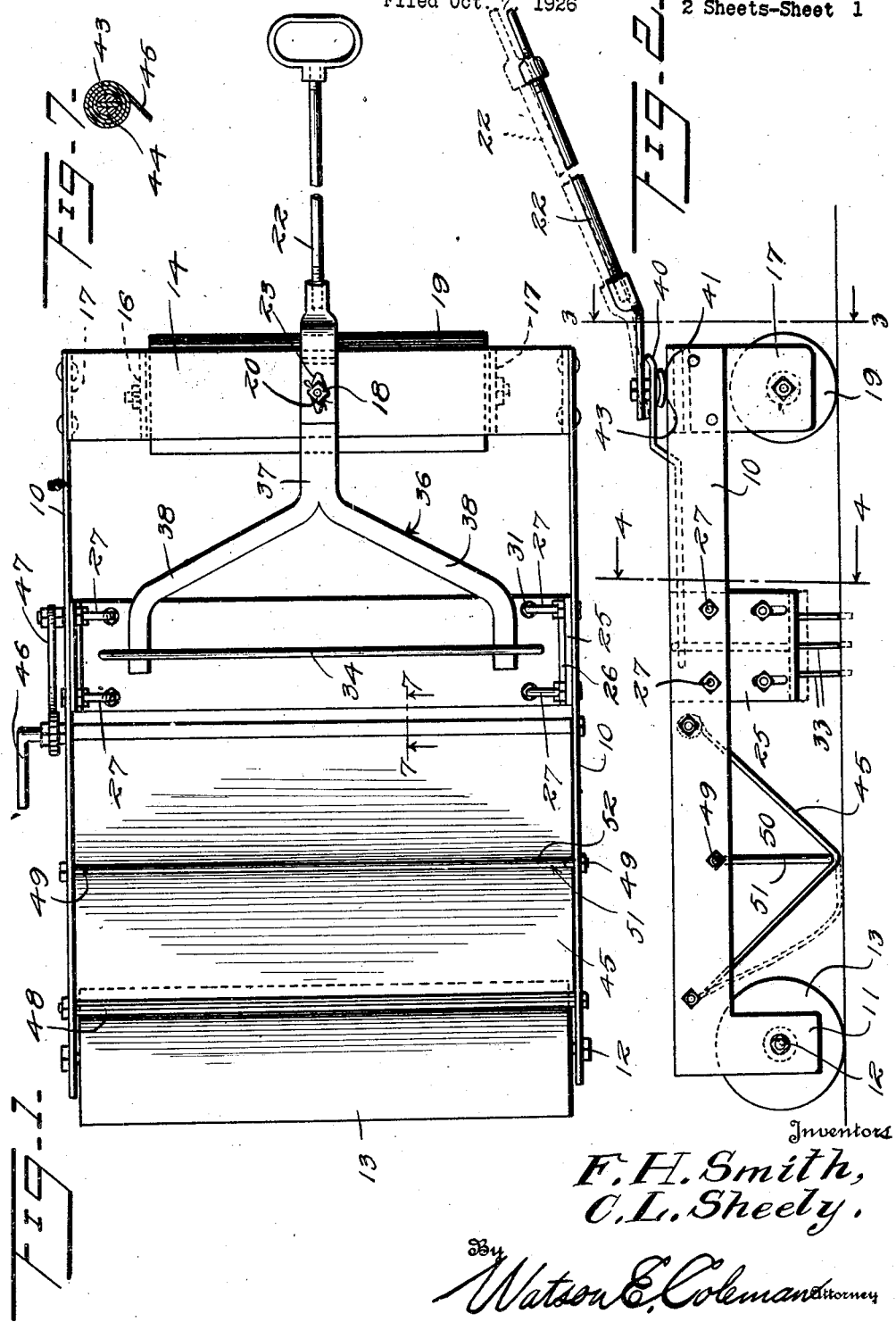
Inventors
F. H. Smith,
C. L. Sheely.
By Watson E. Coleman Attorney

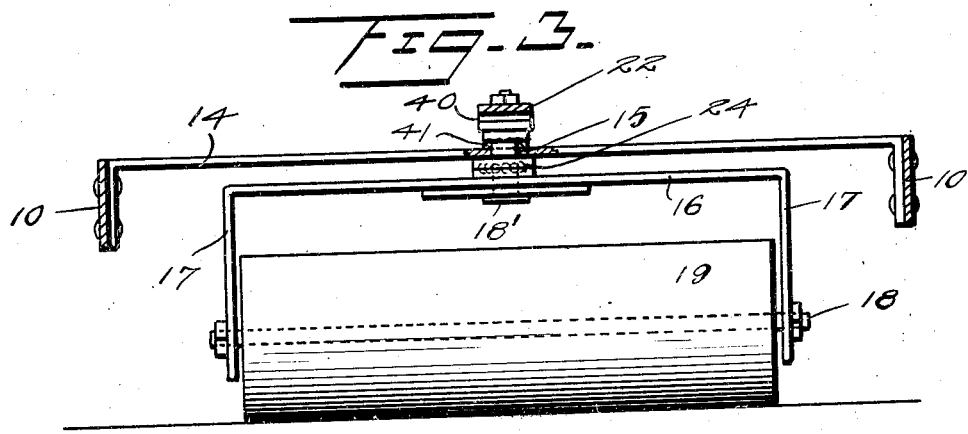
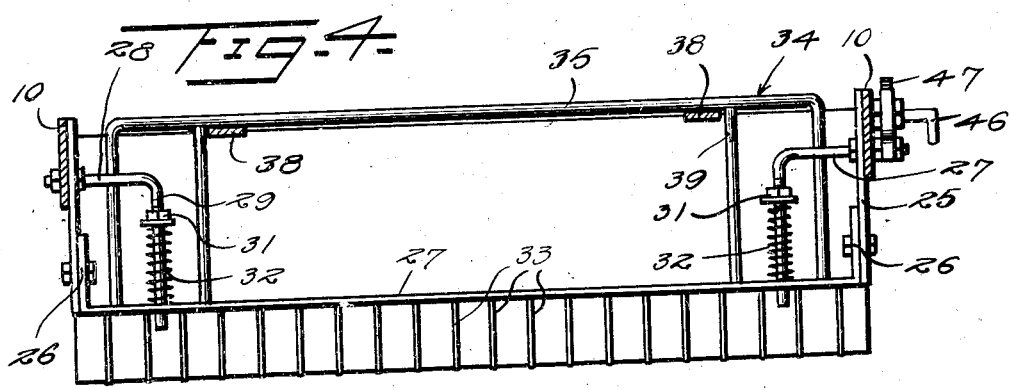
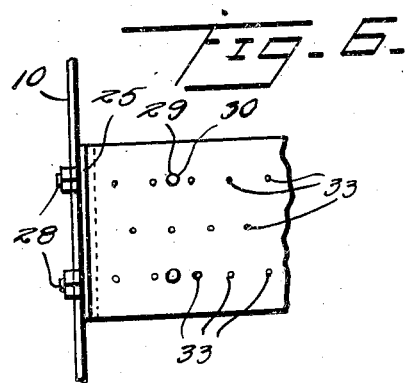
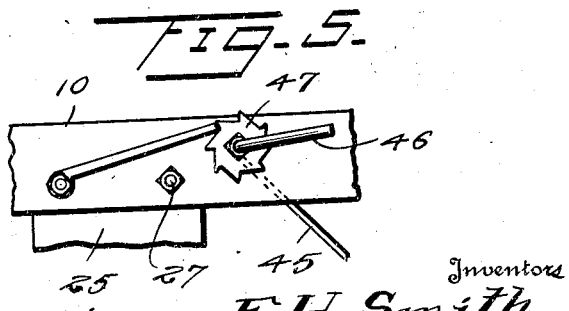

Patented Nov. 1, 1927.

1,647,586

UNITED STATES PATENT OFFICE.

FRANK H. SMITH AND CHRIS L. SHEELY, OF ERIE, KANSAS.

GOLF-COURSE MAINTAINER.

Application filed October 7, 1926. Serial No. 140,130.

This invention relates to golf course maintainers and has for an important object thereof the provision of a device which simultaneously levels and packs the surface of the green.

A further object of the invention is to provide a device of this character which may be quickly shifted from its operative to inoperative state, so that certain portions thereof employed in the treatment of the green are moved out of contact with the ground and are not unduly worn during transportation.

A further object of the invention is to provide a device of this character having a controlling handle by means of which it is drawn over the surface of the green, which controlling handle is so constructed that it may be employed to shift certain ground working implements carried by the maintainer into or out of operative position with relation to the ground.

These and other objects we attain by the construction shown in the accompanying drawings, wherein for the purpose of illustration is shown a preferred embodiment of our invention and wherein :—

Figure 1 is a plan view of a maintainer constructed in accordance with our invention;

Figure 2 is a side elevation thereof showing the maintainer in solid lines in the position which the parts occupy during transportation of the device from place to place and in dotted lines the positions of the movable parts when the device is in use;

Figure 3 is a section on the line 3—3 of Figure 1;

Figure 4 is a section on the line 4—4 of Figure 1;

Figure 5 is a fragmentary side elevation showing the control for the drag;

Figure 6 is a fragmentary bottom elevation of the ground working device;

Figure 7 is a section on the line 7—7 of Figure 1.

Referring now more particularly to the drawings, the numeral 10 generally designates the side members of a frame, the rear ends of which are provided with downwardly projecting extensions 11 in which, adjacent the lower ends thereof, is mounted an axle 12. Upon this axle is mounted a roller 13 which extends the entire width of the frame. At the front end of the frame, side members 10 are connected by a cross member 14 having a central opening 15. A yoke 16 is provided having downturned arms 17 between which upon an axle 18 carried by these arms a roller 19 of less width than the frame is mounted. At its central portion, the yoke 16 has secured thereto an upwardly extending king bolt 18, the upper end of which projects through the front cross member 14 and is squared at 20, as more clearly shown in Figure 1. Upon the upper end of this king bolt above the cross member 14 a handle 22 is mounted, this handle having engagement with the king bolt, as at 23, which will permit the handle to be vertically oscillated but prevent it from rotating with relation to the king bolt. About the king bolt between the cross member 14 and the yoke, a bearing 24 is preferably arranged.

Rearwardly of the cross bar 14, the side members 10 of the frame are provided with downwardly extending arms 25 to the lower ends of which upturned end portions 26 of a transversely extending plate 27 are connected for vertical movement. The arms 25 are secured in position upon the side members 10 by bolts 28, each of which at the inner face of the arm has a downturned extension 29, the lower end of which projects through an opening 30 formed in the plate 27. About these extensions between the plate 27 and the stops 31 carried by the extensions, coil springs 32 are disposed for constantly urging the plate 27 downwardly. The lower surface of this plate is provided with ground working pins 33 which are arranged in rows and the pins of each of which are staggered with relation to the pins of the remaining row. The upper surface of the plate 27 has secured thereto an upwardly extending yoke 34 including a cross bar 35 extending transversely of the frame and paralleling the cross bar 14.

A Y-shaped control member 36 has its stem 37 mounted upon the king bolt 18 immediately beneath the handle 22 and the ends of the arms 38 thereof projected beneath the cross bar 35 of the yoke 34 and held against transverse movement with relation thereto by portions 39 of the yoke. The forward end of the stem portion 37 which underlies the handle 22 in advance of the king bolt 18 is upturned, as at 40, and between this stem and the adjacent face of the cross bar, a washer 41 is placed having a convex face 43 opposing the face of the cross bar 14.

It will be obvious that the handle 22 is forced downwardly to the position shown in solid lines in Figure 2. This handle, by its engagement with the stem 37, will cause the rear ends of the arms 38 of the control member to be elevated and will thereby elevate the plate 27 and its pins 33 against the action of the springs 32, so that these pins are disengaged from the ground.

Immediately rearwardly of the arms 25, the side members 10 are connected by a transversely extending shaft 43 having that portion thereof arranged between the side members split, as at 44, to provide means for clamping to the shaft one end of a fabric sheet 45, so that this sheet may be wound thereon. Exteriorly of one side member, the shaft 43 is provided with a crank 46 whereby it may be rotated and the shaft and adjacent side member have a pawl and ratchet connection, as at 47, so that the shaft may be held with the fabric sheet under a desired tension. The opposite end of the fabric sheet is secured to a transversely extending shaft 48 carried by the side members immediately adjacent the roller 13. The shaft 48 is likewise split, so that the fabric member may be secured thereto. Between the shaft 43 and 48, the side members of the frame are engaged by out-turned portions 49 and the ends of the arms 50 of a U-shaped guide 51, the cross bar 52 of which has its lower face arranged in a plane slightly above the plane connecting the bottom faces of the rollers 13 and 19. The fabric 45 passes about this cross bar 52 and when tensioned, as shown in solid lines in Figure 2, is held out of engagement with the ground. When, however, the shaft 43 is rotated to provide slack in the fabric sheet, the frictional engagement of the sheet against the ground will cause the same to occupy a position such as shown in dotted lines in this figure. The cross bar provides a limit for rearward movement, so that a portion of the fabric is dragging over the sandy surface of the tee to smooth out the ridges formed by the ground working pins 33 to prepare the ground for the passage of the packing roller 13. The fabric employed is preferably relatively heavy carpet or some such material which is quite flaccid and of considerable weight. It will, of course, be obvious that in moving the device when not in use, this fabric is tensioned and the handle 22 is depressed, so that ground working pins 33 are in inoperative position.

Since the construction hereinbefore set forth is capable of a certain range of change and modification without materially departing from the spirit of the invention, we do not limit ourselves to such specific structure except as hereinafter claimed.

We claim:—

1. In a golf course maintainer, a frame having front and rear rollers, a handle pivotally connected with the front of the frame for vertical movement with relation thereto, ground working implements carried by the frame and operatively connected with the handle whereby vertical movement of the handle in one direction shifts the ground working implements to inoperative position, means normally maintaining the ground working implements in operative position, a fabric sheet supported from the frame between the ground working implements and the rear roller and adapted to engage the surface of the green as a drag.

2. In a golf course maintainer, a frame having front and rear rollers, a handle pivotally connected with the front of the frame for vertical movement with relation thereto, ground working implements carried by the frame and operatively connected with the handle whereby vertical movement of the handle in one direction shifts the ground working implements to inoperative position, means normally maintaining the ground working implements in operative position, a fabric sheet supported from the frame between the ground working implements and the rear roller and adapted to engage the surface of the green as a drag and means for elevating the fabric sheet from engagement with the ground.

3. In a golf course maintainer, a frame having front and rear rollers, a handle pivotally connected with the front of the frame for vertical movement with relation thereto, ground working implements carried by the frame and operatively connected with the handle whereby vertical movement of the handle in one direction shifts the ground working implements to inoperative position, means normally maintaining the ground working implements in operative position, a fabric sheet supported from the frame between the ground working implements and the rear roller and adapted to engage the surface of the green as a drag and means carried by the frame and engaging the fabric sheet preventing slack in the fabric sheet from moving rearwardly beneath said rear roller.

4. In a golf course maintainer, a frame having front and rear rollers, a handle pivotally connected with the front of the frame for vertical movement with relation thereto, ground working implements carried by the frame and operatively connected with the handle whereby vertical movement of the handle in one direction shifts the ground working implements to inoperative position, means normally maintainig the ground working implements in operative position, a fabric sheet supported from the frame between the ground working implements and the rear roller and adapted to engage the surface of the green as a drag, means carried by the frame and engaging the fabric sheet preventing slack in the fabric sheet from moving rearwardly beneath said rear roller and means for tensioning the fabric sheet to withdraw the same from engagement with the ground.

5. In a golf course maintainer, a frame having front and rear rollers, a handle pivotally connected with the front of the frame for vertical movement with relation thereto, ground working implements carried by the frame and operatively connected with the handle whereby vertical movement of the handle in one direction shifts the ground working implements to inoperative position, means normally maintaining the ground working implements in operative position, a fabric sheet supported from the frame between the ground working implements and the rear roller and adapted to engage the surface of the green as a drag and means carried by the frame and engaging the fabric sheet preventing slack in the fabric sheet from moving rearwardly beneath said rear roller comprising a horizontal bar extending transversely of the frame and in proximity to the ground and about which the sheet passes.

6. In a golf course maintainer, a frame having front and rear rollers, a handle pivotally connected with the front of the frame for vertical movement with relation thereto, ground working implements carred by the frame and operatively connected with the handle whereby vertical movement of the handle in one direction shifts the ground working implements to inoperative position, means normally maintaining the ground working implements in operative position, a fabric sheet supported from the frame between the ground working implements and the rear roller and adapted to engage the surface of the green as a drag, a shaft rotatably supported by and extending transversely of the frame to which one end of the fabric sheet is secured and means for securing said shafts in rotatably adjusted positions.

7. In a golf course maintainer, a frame having front and rear rollers, a handle pivotally connected with the front of the frame for vertical movement with relation thereto, ground working implements carried by the frame and operatively connected with the handle whereby vertical movement of the handle in one direction shifts the ground working implements to inoperative position, means normally maintaining the ground working implements in operative position, a fabric sheet supported from the frame between the ground working implements and the rear roller and adapted to engage the surface of the green as a drag, a shaft rotatably supported by and extending transversely of the frame to which one end of the fabric sheet is secured, means for securing said shafts in rotatably adjusted positions, there being a second shaft spaced from the first named shaft to which the opposite end of the sheet is secured and a bar secured to and extending transversely of the frame about which said sheet passes intermediate said shafts.

8. In a golf course maintainer, a frame having front and rear rollers, a handle pivotally connected with the front of the frame for vertical movement with relation thereto, ground working implements carried by the frame and operatively connected with the handle whereby vertical movement of the handle in one direction shifts the ground working implements to inoperative position, means normally maintaining the ground working implements in operative position, a fabric sheet supported from the frame between the ground working implements and the rear roller and adapted to engage the surface of the green as a drag, a shaft rotatably supported by and extending transversely of the frame to which one end of the fabric sheet is secured, means for securing said shafts in rotatably adjusted positions, there being a second shaft spaced from the first named shaft to which the opposite end of the sheet is secured and a bar secured to and extending transversely of the frame about which said sheet passes intermediate said shafts, said sheet when tensioned about said bar having its lowermost point vertically spaced above a plane including the bottom faces of said rollers.

9. In a golf course maintainer, a frame having front and rear rollers, a handle whereby the frame may be drawn over the ground pivotally connected with the front of the frame for vertical movement with relation thereto, ground working implements carried by the frame and operatively connected with the handle whereby vertical movement of the handle in one direction shifts the ground working implements to inoperative position and means normally maintaining the ground working implements in operative position.

10. In a golf course maintainer, a frame having front and rear rollers and a front bar, a handle pivotally connected with the front bar for vertical movement with relation thereto, a transversely extending plate carried by the frame and capable of limited vertical movement with relation thereto, ground working pins extending downwardly from the lower face of said plate, means normally urging the plate downwardly and a connection between said plate and the handle whereby a predetermined movement of the handle in a vertical plane causes said plate to be elevated when the pins thereof are withdrawn from engagement with the ground.

In testimony whereof we hereunto affix our signatures.

FRANK H. SMITH.
CHRIS L. SHEELY.